(12) United States Patent
Zoldi et al.

(10) Patent No.: US 10,579,938 B2
(45) Date of Patent: Mar. 3, 2020

(54) REAL TIME AUTONOMOUS ARCHETYPE OUTLIER ANALYTICS

(71) Applicant: FAIR ISAAC CORPORATION, San Jose, CA (US)

(72) Inventors: Scott Michael Zoldi, San Diego, CA (US); Yuting Jia, San Diego, CA (US); Kiyoung Yang, San Diego, CA (US); Heming Xu, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 772 days.

(21) Appl. No.: 15/002,297

(22) Filed: Jan. 20, 2016

(65) Prior Publication Data
US 2017/0206466 A1    Jul. 20, 2017

(51) Int. Cl.
*G06N 7/00*    (2006.01)
*G06N 20/00*    (2019.01)
(Continued)

(52) U.S. Cl.
CPC ........... *G06N 20/00* (2019.01); *G06F 3/0485* (2013.01); *G06K 9/00442* (2013.01);
(Continued)

(58) Field of Classification Search
None
See application file for complete search history.

(56) References Cited

U.S. PATENT DOCUMENTS 8,041,597 B2 * 10/2011 Li .................. G06Q 10/063
705/14.47
2013/0204755 A1 * 8/2013 Zoldi .............. G06Q 20/4016
705/30

(Continued)

OTHER PUBLICATIONS

Zoldi, Determining Outlierswith Self-Calibrating Models, FICO Blog at p. 1-4 (Aug. 2012), retrieved from internet <https://www.fico.com/blogs/fraud-security/fraud-analytics-that-adapt-on-the-fiy/> (Year: 2012).*

(Continued)

*Primary Examiner* — Lut Wong
(74) *Attorney, Agent, or Firm* — Mintz Levin Cohn Ferris Glovsky and Popeo, P.C.

(57) ABSTRACT

The current subject matter describes a method and system of detecting frauds or anomalous behavior. The procedures include extracting characteristics from a dataset to generate words and documents, executing a topic model to obtain the respective probabilities of appearance of a document in each latent archetype, dividing the dataset into a plurality of subsets based upon the archetypes. The formed subsets are further utilized to estimate the quantiles and calculate scores using a self-calibrating outlier model. The score of each new transaction is determined based on a single archetype or based on the sum of weighted scores determined from all the archetypes and associated statistics. Such methods are superior to a simple self-calibration outlier model without an LDA archetype. The detection system with the LDA archetypes and self-calibrating outlier model is implemented with
(Continued)

A block diagram of a topic model build the sliding window technique incorporating new transactions into the topic model and it is capable of operating in real-time for the purpose of identifying frauds and outliers.

19 Claims, 13 Drawing Sheets

(51) Int. Cl.
*G06K 9/00* (2006.01)
*G06K 9/62* (2006.01)
*G06Q 40/00* (2012.01)
*G06F 3/0485* (2013.01)
*G06T 11/20* (2006.01)

(52) U.S. Cl.
CPC .......... *G06K 9/6234* (2013.01); *G06N 7/005* (2013.01); *G06Q 40/00* (2013.01); *G06T 11/206* (2013.01)

(56) References Cited

U.S. PATENT DOCUMENTS

2014/0180974 A1* 6/2014 Kennel ................. G06N 7/005
 706/12
2015/0178825 A1* 6/2015 Huerta ................. G06Q 40/00
 705/35

OTHER PUBLICATIONS

Bolton & Hand, Unsupervised Profiling Methods for Fraud Detection, Proc. Credit Scoring and Credit Control VII (2001) at pp. 1-16 (Year: 2001).*
Blei et al., Latent Dirichlet Allocation, J. Mach. Learning Research vol. 3 at p. 993-1022 (2003) (Year: 2003).*

* cited by examiner

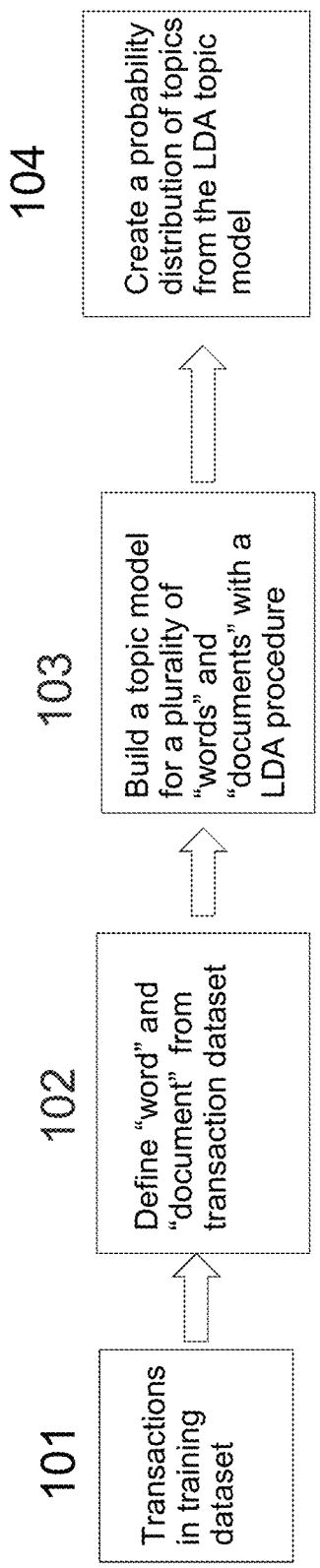
FIG 1 A block diagram of a topic model build

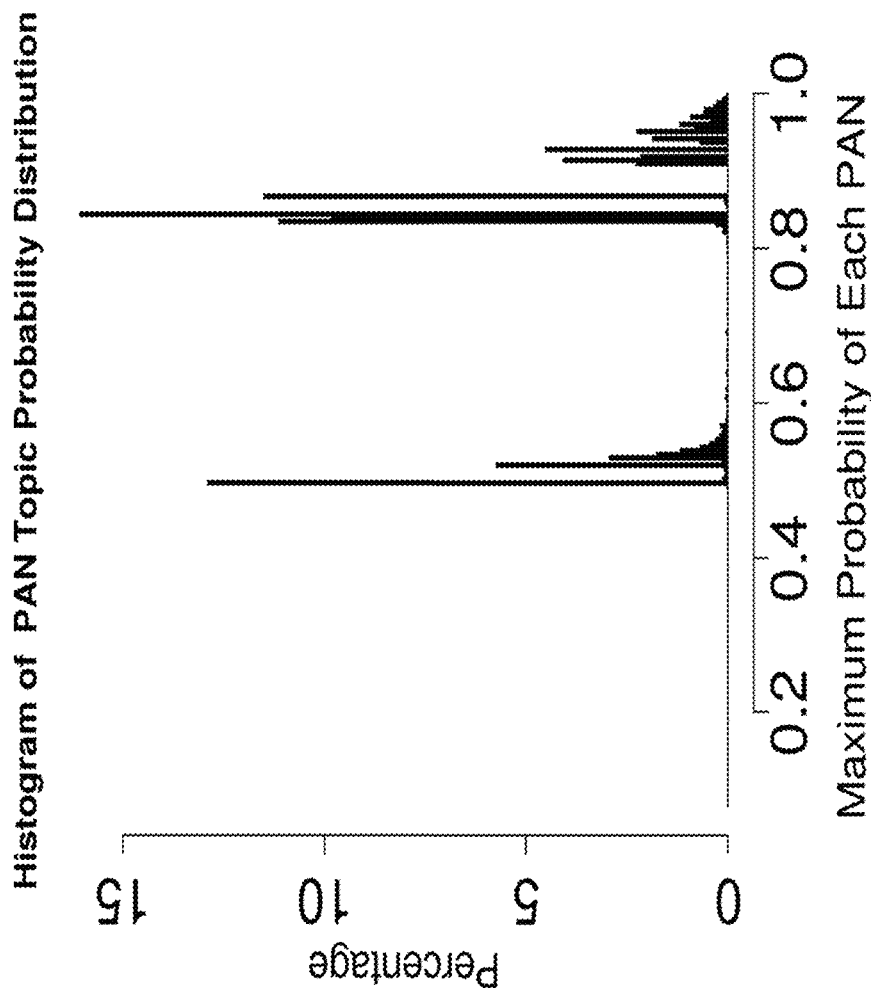
FIG 2 Exemplary distribution of PAN's probability in archetypes

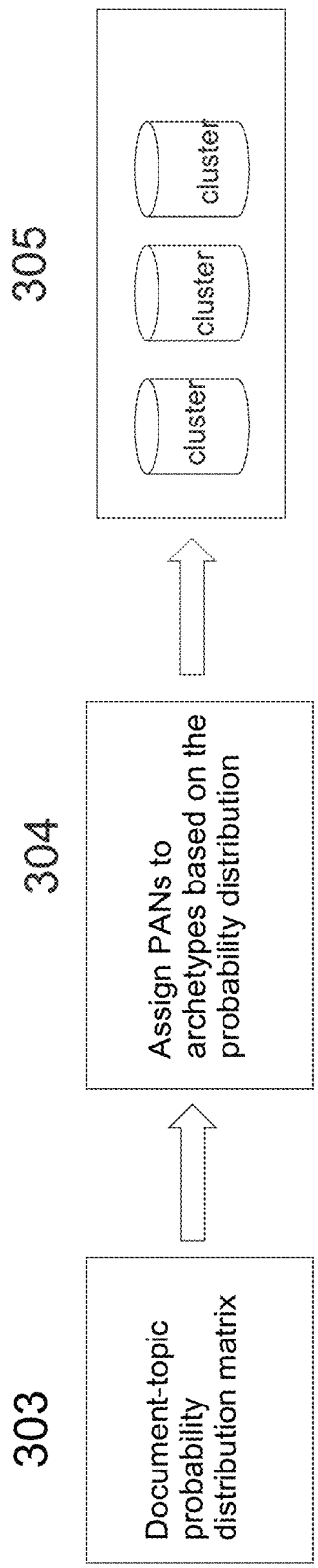
FIG 3 A block diagram of clustering by archetypes

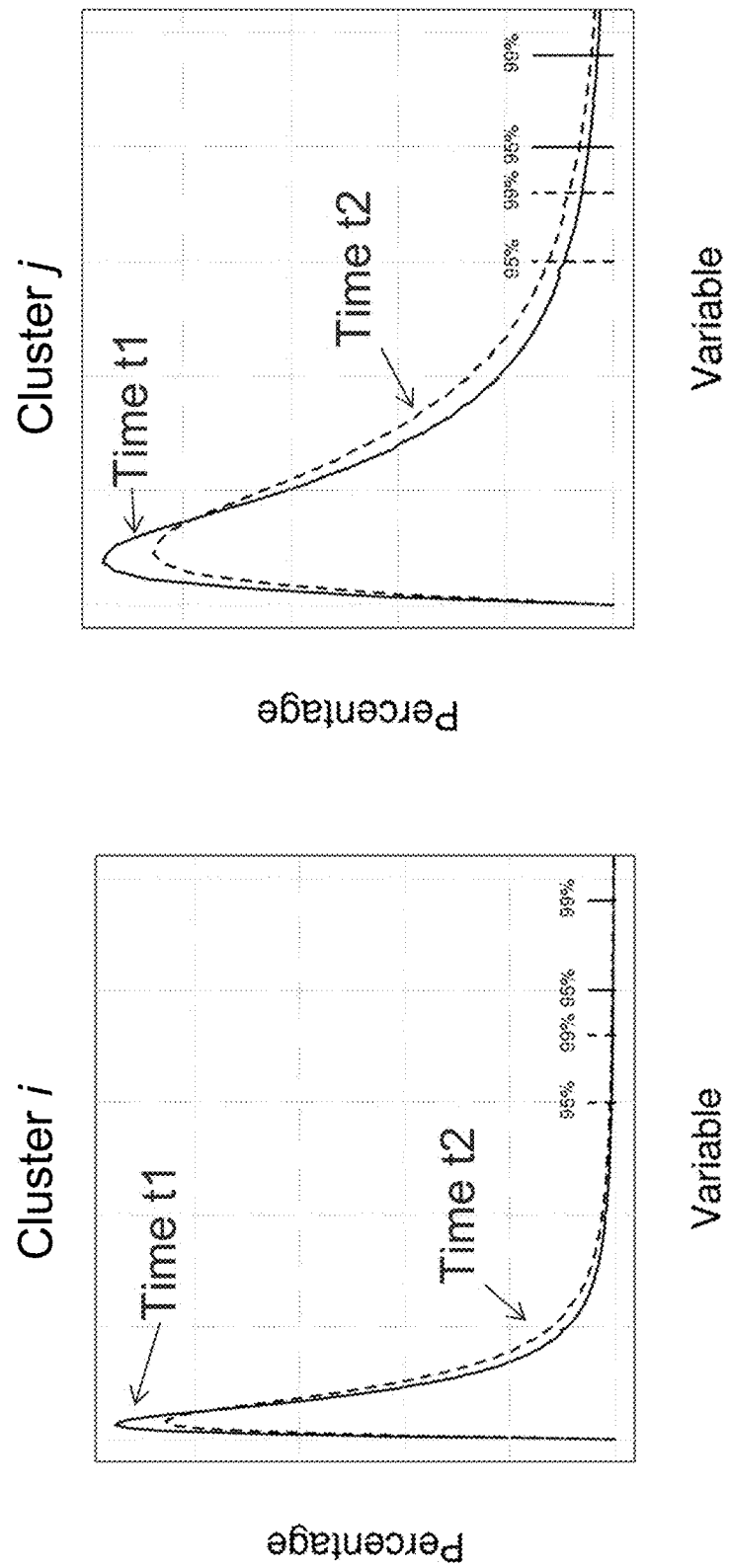
FIG 4 Illustrative variable distributions in clusters

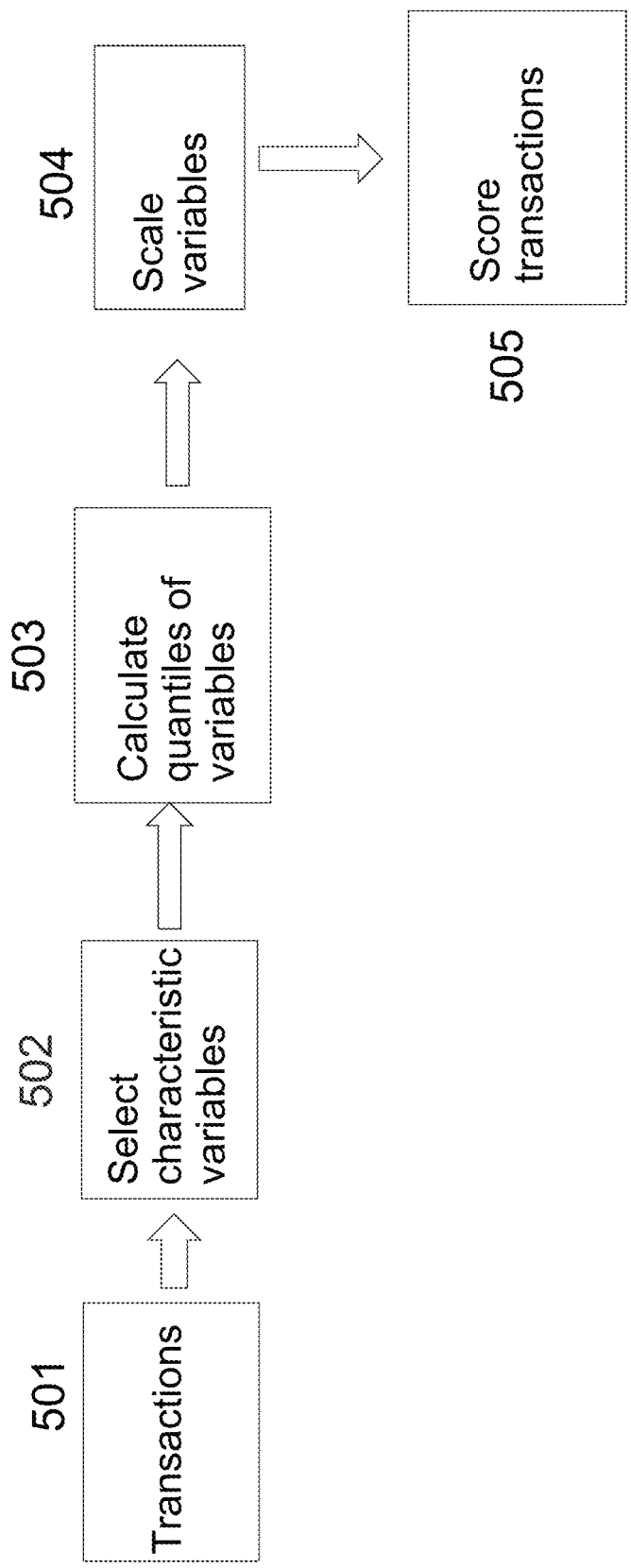
FIG 5 A block diagram of self-calibrating outlier model

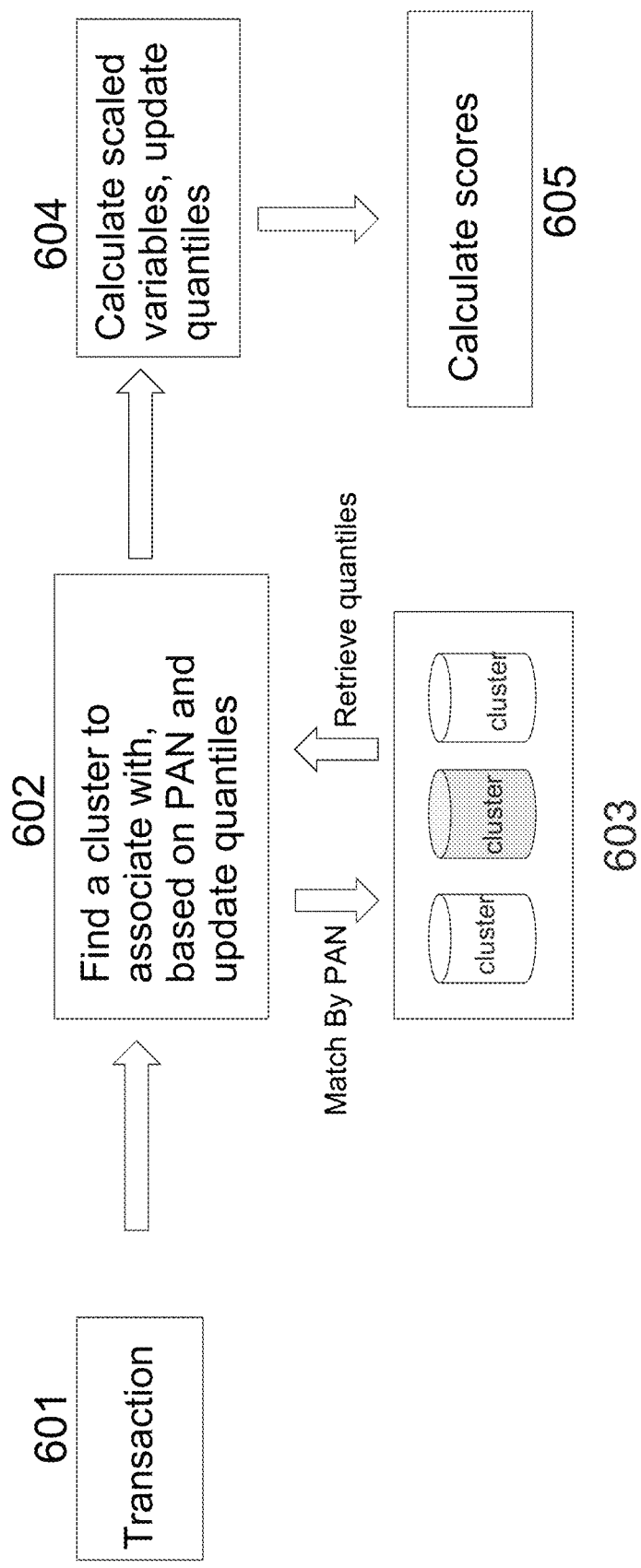
FIG 6 A block diagram of evaluating a new transaction

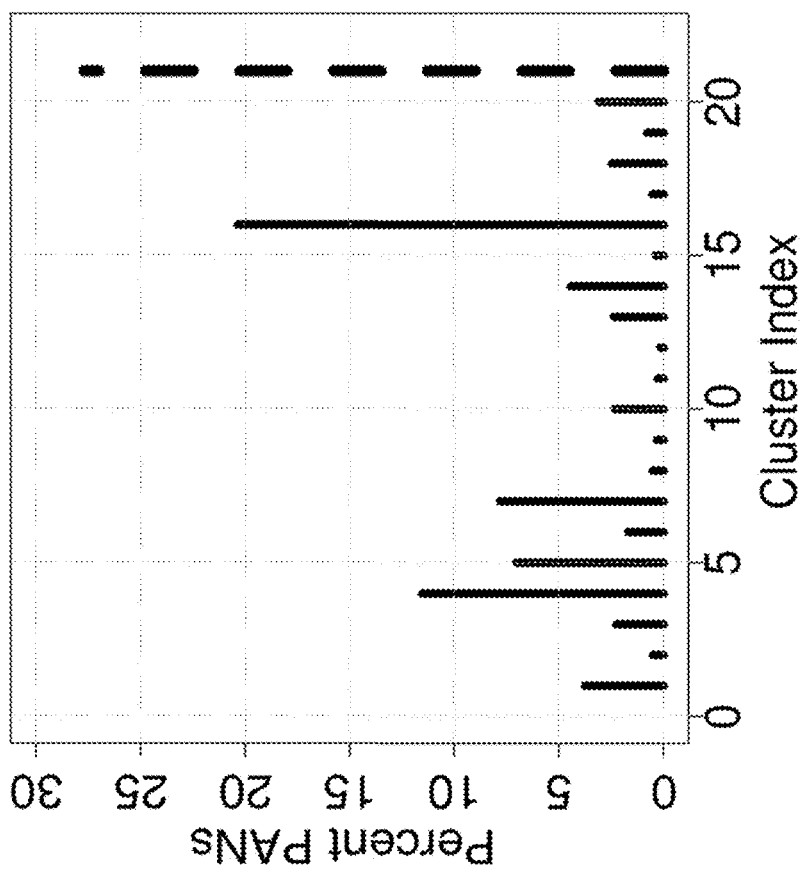
FIG 7 Exemplary PAN distribution in LDA clusters using a threshold

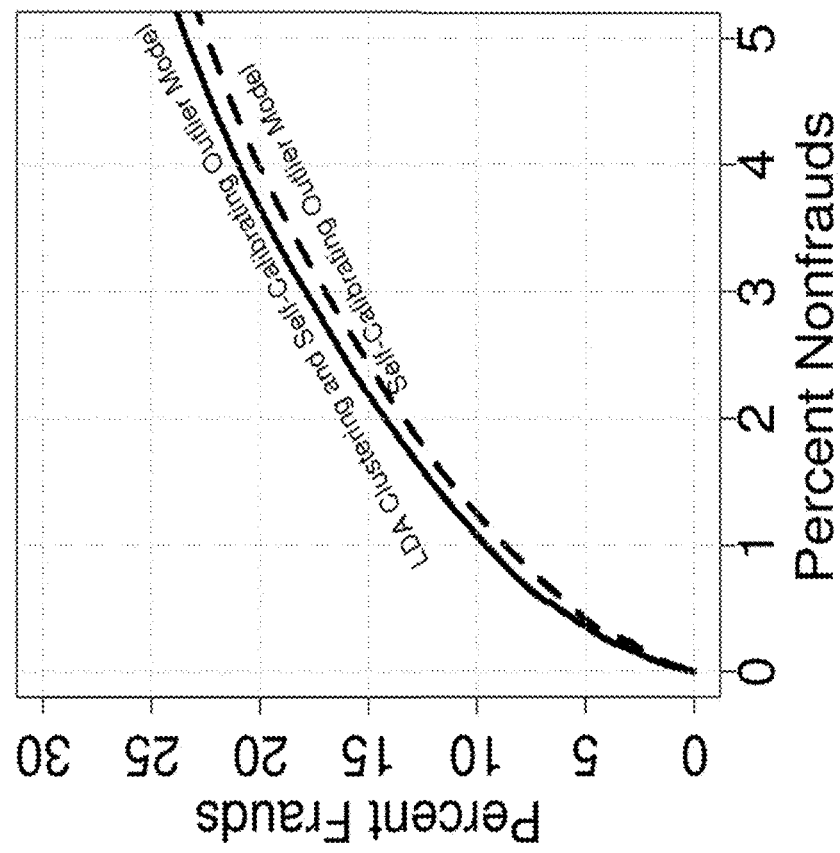
FIG 8 Exemplary performance of LDA and self-calibrating outlier model using a threshold

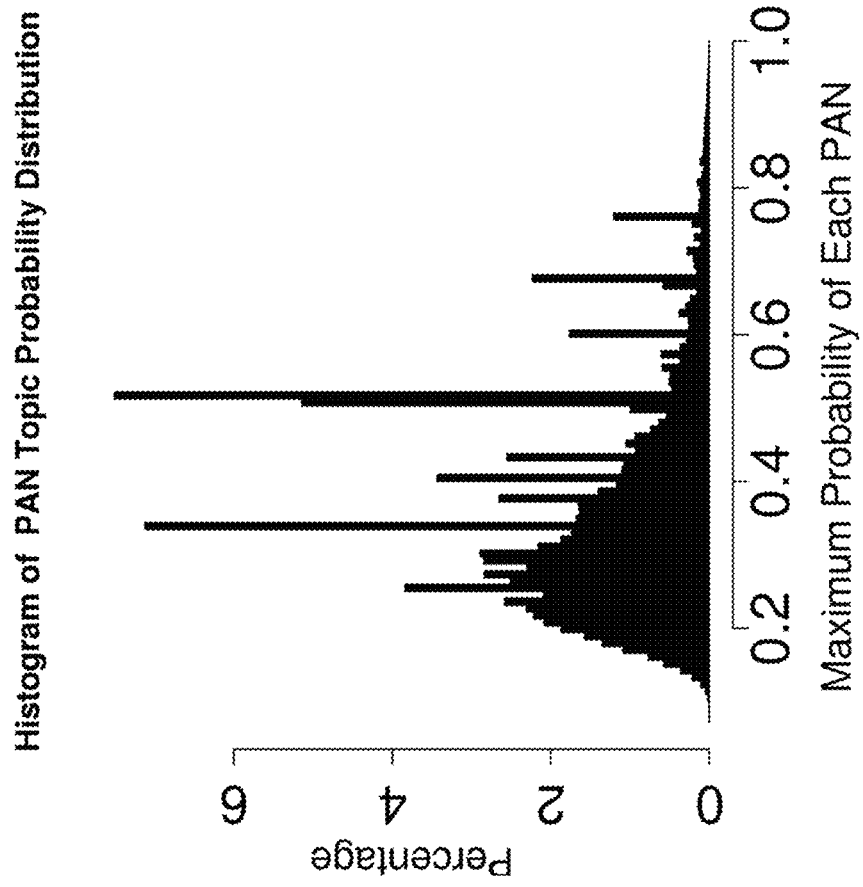
FIG 9 Another distribution of PAN's probability in archetypes

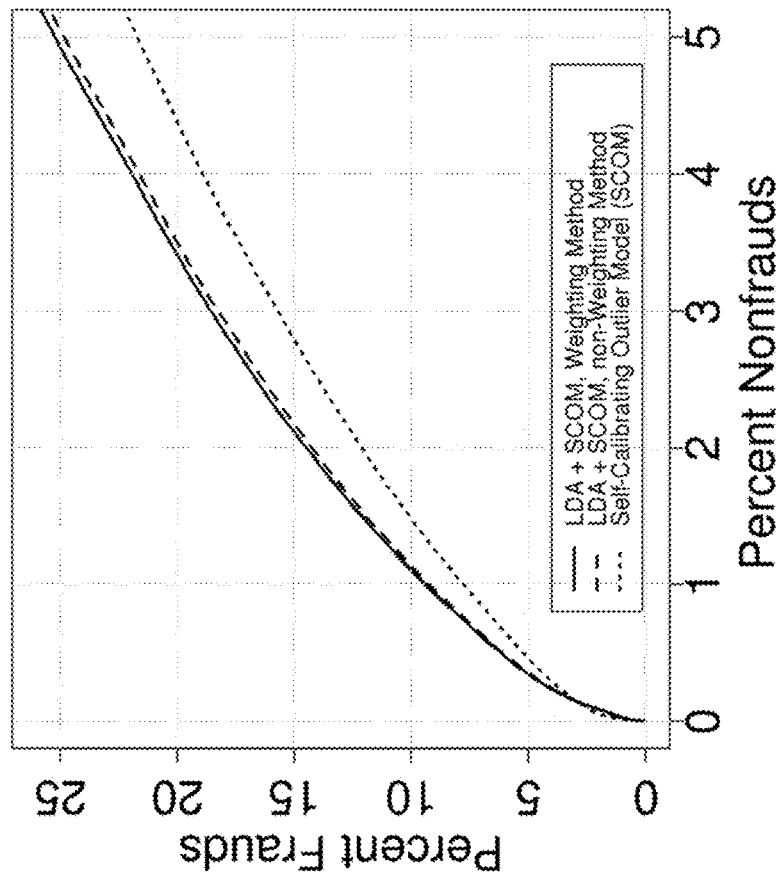
FIG 10 Exemplary performance of the weighting method

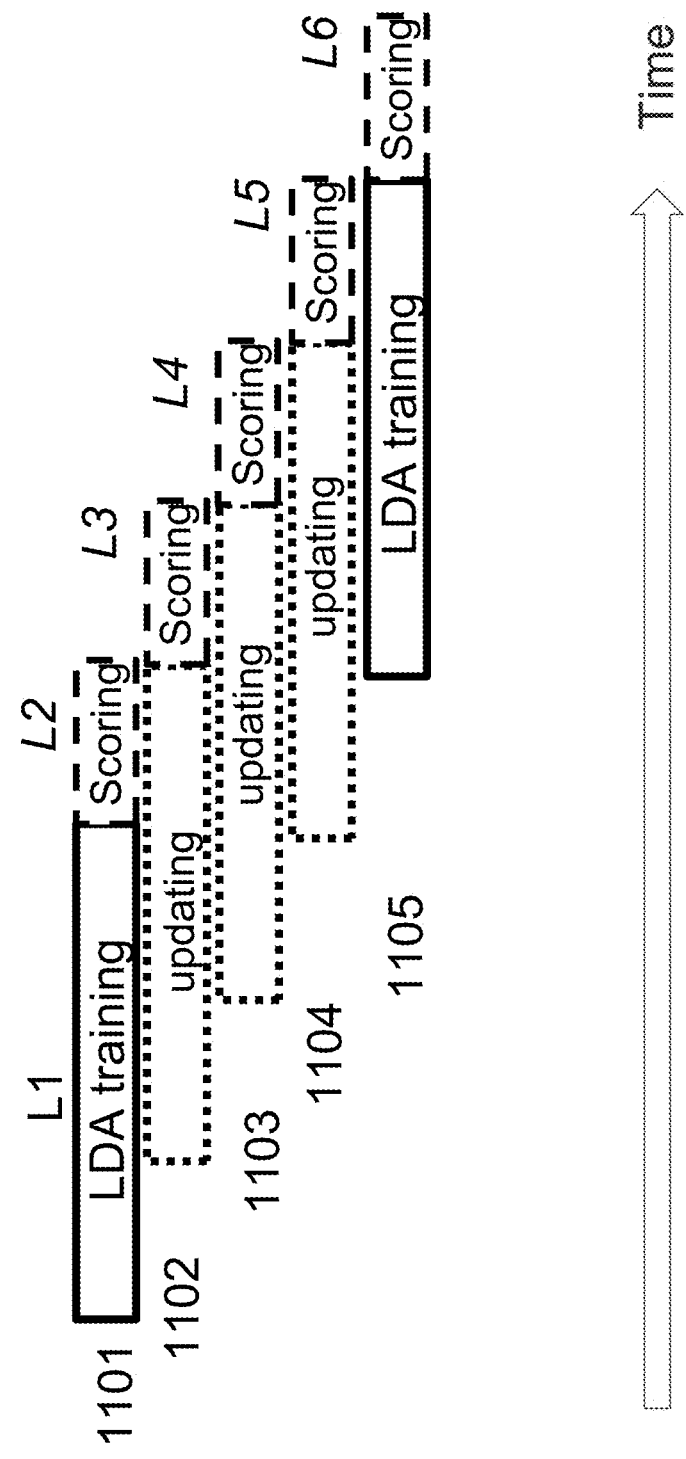

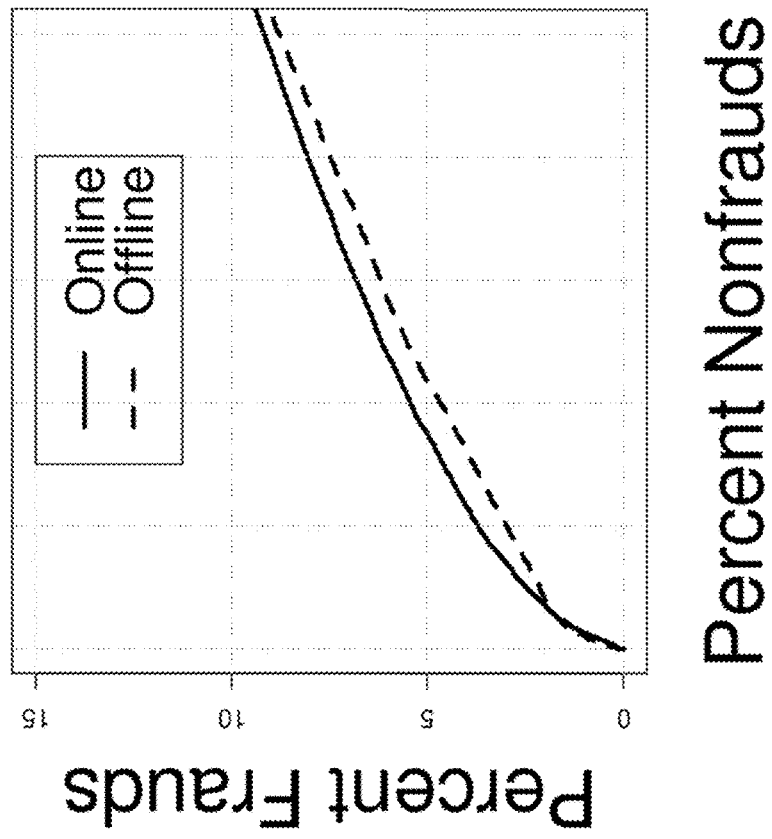
FIG 12 Exemplary performance of the online method

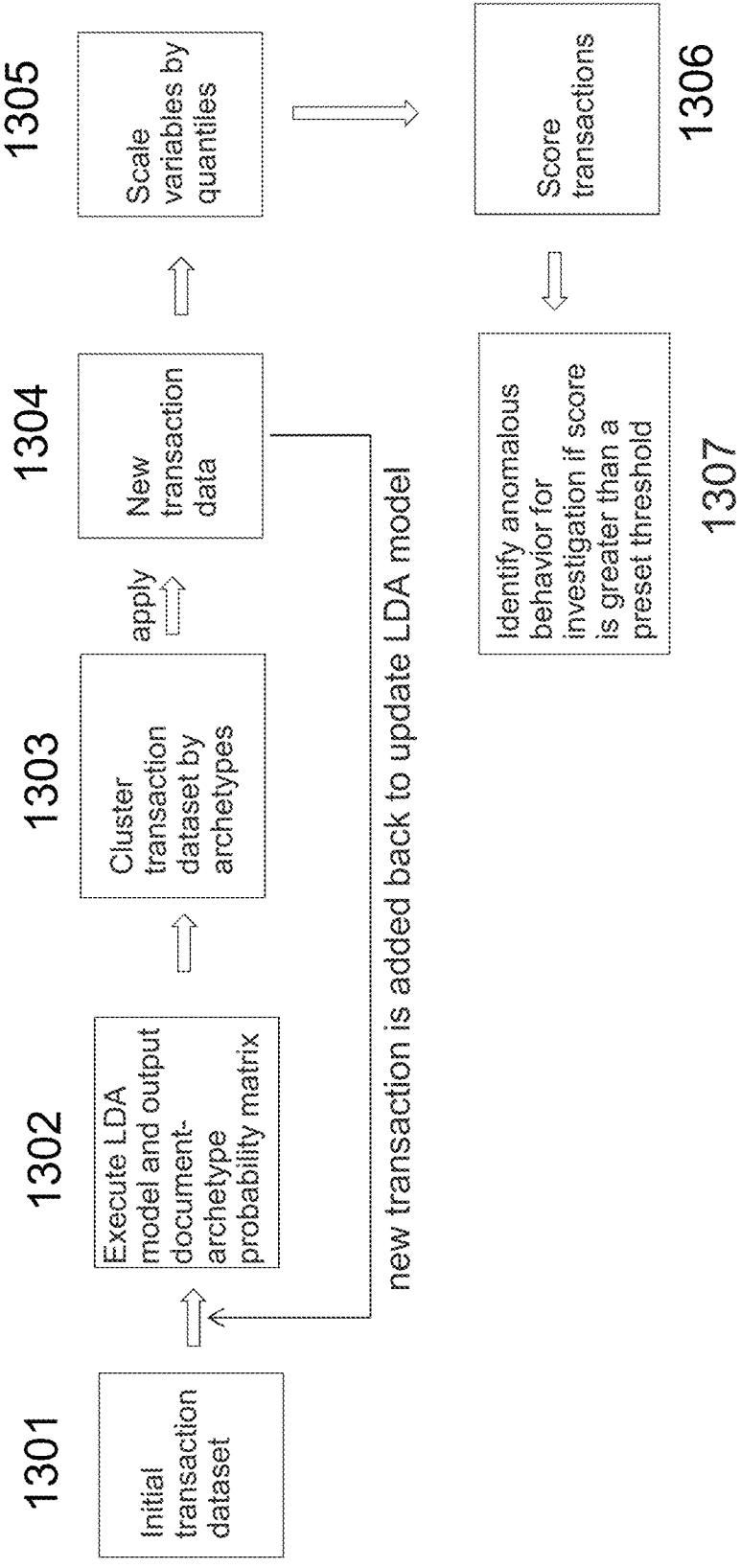
FIG 13 A schematic diagram of an exemplary real-time autonomous outlier detection system

REAL TIME AUTONOMOUS ARCHETYPE OUTLIER ANALYTICS

TECHNICAL FIELD

This disclosure relates generally to anomaly/outlier detection by machines in electronic transactions initiated by humans. More particularly, this disclosure is related to a computer-implemented method and system for identifying subsets of transactions based on archetypes developed from a Latent Dirichlet Allocation (LDA) model, and generating an outlier-detection score using a self-calibrating outlier model which is developed on each subset of transaction data based on archetype assignment.

BACKGROUND

In financial industry, as an example, understanding the spending patterns of each of a huge number of customers is critical in order to rapidly detect fraudulent transactions so as to mitigate monetary losses. The patterns may be related to, and established based on, the spending time, merchant location, amount and merchant category code (MCC), etc. One of the most prominent fraud models in the industry, the Falcon® model developed by FICO, Inc., has been successfully developed upon historical transaction data. That model is a data-driven model and is trained on a historical transaction dataset that includes transactions and the associated transaction tags which indicate whether the transaction is fraudulent or legitimate. Thus, the quality of the tags is essential for success in operations in the real world.

Such models developed with the complete dataset with tags are commonly called "supervised" models. However, there are many limitations to collecting tags for transactions. The quality of the tags might not be well defined, and in some cases the tags might not be available immediately, for example, in a real time scenario. Thus, the need for access to high quality historical data to develop supervised models poses an obstacle to the development of the trained models. To circumvent this obstacle, various methods, may be used to approximate the tags by grouping the customers based on the similarity between the spending patterns, resulting in poor performance of the supervised models.

In the absence of transaction tags in the dataset, a model might be built using an algorithm to group entities without scoring them. A model developed in such a way is referred to as an "unsupervised" model since the target classes are neither known nor used. In such an approach similar transactions are grouped together while dissimilar transactions are separated into different groups. For example, transactions that are similar in date, time, amount and location, etc., may be grouped together and may share similar characteristics, depending on the grouping scheme used.

What is needed is a method and model to efficiently detect any anomalous behavior in transactions, which is developed upon an adequate processing and understanding of characteristics of the entities involved.

SUMMARY

This document describes a system and method to detect anomalies or outliers in transactions without utilizing tags of transactions. Latent topics (or archetypes) in the dataset are exploited, and then the dataset is divided into subsets in terms of the informative probability of the transaction ingredients in the topics. The subset of data associated with an archetype forms the statistics on which the future transaction variable values are compared. The characteristic variables are computed by computer processors for each transaction and quantiles for self-calibrating model are calculated in each subset of whole population, and scores are subsequently obtained by a self-calibrating model using these scaled variables. In these so-called "self-calibrating models," outlier values of the variables may be dependent on the real-time estimation of the variable distributions to determine outliers, after which the scores are computed from the scaled variables.

In one aspect, a computer-implemented system and method for detecting transaction outliers in a dataset representing a plurality of transactions is disclosed. The system and method include selecting, by one or more data processors, words of documents associated with a plurality of transaction characteristics in the dataset. The method further includes executing a topic model using the words of the documents in the dataset to generate a document-archetype probability matrix comprising a plurality of archetypes, and assigning each document to at least one archetype of the plurality of archetypes based on probability values associated with the topic model. The method further includes dividing the documents of the dataset into different subsets based on the at least one archetype, and computing statistics of the plurality of transactions within each of the different subsets associated with the at least one archetype. The method further includes identifying an archetype of one or more incoming transactions and scoring the one or more incoming transactions based on the statistics of the different subsets associated with the at least one archetype.

In another aspect, a computer-implemented method for detecting transaction outliers in a plurality of transactions in a dataset includes the steps of executing, by one or more data processors, a Latent Dirichlet Allocation (LDA) topic model to obtain a document-topic probability matrix on a collection of documents and words from a plurality of transaction characteristics in a dataset of transactions. The method further includes splitting the dataset into subsets according to a probability distribution defined by the document-topic probability matrix from the LDA topic model, the probability distribution further defining a plurality of archetypes, each archetype having a designed threshold. The method further includes associating a new transaction with at least one archetype from the plurality of archetypes, calculating quantiles for each subset of the dataset from the new transaction to generate quantile scaled variables, and scoring the new transaction according to the quantile scaled variables. The method further includes updating the quantiles for each subset for the plurality of transactions including the new transaction, and updating the LDA topic model-based document-topic probability matrix based on the characteristics of the new transaction.

Implementations of the current subject matter include, but are not limited to, systems and methods consistent with one or more features as described herein, as well as articles that comprise a tangibly embodied machine-readable medium operable to cause one or more machines (e.g., computers, etc.) to result in operations as described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 is a block diagram of a Latent Dirichlet Allocation archetype model build;

FIG. 2 shows an exemplary distribution of a Primary Account Number's (PAN's) probability in archetypes;

FIG. 3 is a block diagram of identifying subsets by archetypes;

FIG. 4 shows illustrative variable distributions in archetypes;

FIG. 5 is a block diagram of self-calibrating scoring system;

FIG. 6 is a block diagram of evaluating a new transaction;

FIG. 7 illustrates an exemplary PAN distribution in LDA archetypes using a threshold;

FIG. 8 shows exemplary performance of LDA and self-calibrating outlier model using a threshold;

FIG. 9 shows another distribution of PAN's probability in archetypes;

FIG. 10 illustrates an exemplary performance of a weighting method;

FIG. 11 shows a schematic diagram of the online method;

FIG. 12 depicts exemplary performance of the online method;

FIG. 13 shows a schematic diagram of an exemplary real-time autonomous outlier detection system;

When practical, similar reference numbers denote similar structures, features, or elements.

DETAILED DESCRIPTION

This document describes a system and method to detect fraudulent transactions as unsupervised models. A topic model is built on a training dataset, generating a document Primary Account Number (PAN)-topic probability matrix. Then, the training dataset is grouped into subsets based on a topic probability distribution over the transaction accounts. Each subgroup contains PANs that are closely associated with a single topic. New transactions are evaluated by identifying the archetypes to which their PANs belong, and then using a self-calibrating outlier model to score the new transaction based on scaled variables associated with the transaction. Systems implementing this method are capable of operating in real time to detect frauds and anomalies as they occur.

Characteristics of the transactions include, without limitation, transaction date, transaction time, amount, location, merchant category code (MCC), etc. These raw features of transactions may be directly used in model development. In general, features from the raw variables are frequently transformed into other variables in order to effectively reveal fraudulent characteristics. Those derived (transformed) variables may be mingled with the raw variables to form a feature set. It should be noted that not all the features have the same significance in contributing to the classification capability, and thus only a limited and practical pool of features may be used in the model construction. In addition, in some implementations, business knowledge can also be used in a process of selecting final variables.

In some implementations, a process includes two phases: a training phase and a testing phase. For example, historical transactions may be used in the training phase to build a machine learning model. Thus the machine learning model is data-driven. In the testing phase, the transactions in a given testing dataset are fed into a built machine learning model, and a characteristic for each transaction is predicted based on the features in the current transaction and compared to the training samples. Note in the testing phase the transactions in the given testing dataset are fed into the built machine learning model and a score for each transaction is predicted based on features in the current transaction, and compared to the actual classes if available, as they appear in the testing dataset, which is subsequently represented in an accuracy measure to assess the performance of the built learning model.

It should be understood that the features of transaction include merchant category code, location, amount, etc. These entities can characterize various aspects of the observed transaction data and some combinations of these aspects. In analogy with the document processing, these features pertaining to a transaction may be referred to as "words". The generated words can be categorical. Continuous features such as amounts may be discretized into a categorical type. In such a way, each transaction is transformed into a collection of words.

Further, a transaction is performed by a client using the account. The account may be characterized with the primary account number (PAN) which is unique across all the accounts. The account (PAN) may be referred to as a "document" that holds numerous "words" that characterizes observed data such as transaction amount, transaction date, MCC, etc. With "word" and "document" defined for each transaction and PAN, the frequency of words appearing in the documents can be processed to reveal intrinsic transaction patterns. After this transformation, a topic model can be built for a transaction dataset.

Topic models are a preferred approach for representing the content of documents and retrieving information from the documents related to selected topics. For example, the Latent Dirichlet allocation (LDA) model or a similar generative model produces a probability distribution of topic membership for each document within a group of content that can be treated as a vector. (It should be noted that the "topic" and "archetype" are used interchangeably hereafter). Some assumptions underlying LDA models include: documents are represented as a mixture over latent topics, where each topic is characterized by a distribution over words; a plurality of topics/archetypes are included in the document set; and the frequency of appearance of a word included in a document results from a topic (archetype) included in the document set. The archetypes may be estimated from a large dataset and represent abstraction of generally correlated behavior, thus the LDA model may assist in learning the intrinsic structure from the dataset.

Each document (for example, a PAN) represents a data point in a dataset that can be classified into different subsets, i.e. by associated spending patterns. The LDA model identifies a fixed number of latent topics (archetypes) in a collection of documents based on similarity of words of the documents and explains sets of observations regarding data similarity with unobserved groups. The LDA model is a probability generation model and can be used to identify latent topic information in a large-size document set. The LDA model utilizes a collection of words method in which each document is regarded as a word frequency vector so that document information is transformed into a numerical representation that can be conveniently modeled. Upon execution of the LDA model, each document represents a probability distribution formed by some topics (that is a mixed membership in all the topics) and each topic represents a probability distribution formed by many words. Such obtained topics can capture concepts and general terms associated with the set of documents, resulting in assigning the documents to archetypes.

FIG. 1 is a block diagram of building a topic model from a transaction dataset 101 in accordance with some implementations. Each transaction is characterized by a transaction date, a transaction time, an amount, a merchant category code (MCC), location, etc. First, the "word" and "document" can be defined from the transaction dataset 101. A single entity (or called element), e.g., MCC or location, may be selected as words to track the activities of each PAN account, and which can result in an MCC and location LDA model, respectively. Further, a combination of several elements like MCC-location, MCC-amount, etc., also can be used as words for LDA models. Such combinations can reduce the number of words to make it feasible to train an LDA model. Entities with continuous values, e.g., transaction amount, can be binned into a few categories for processing. The words and documents are defined in block 102 and the transaction dataset is transformed into a set of discrete entities, that is, each document (PAN) corresponds to a collection of words from all the transactions belonging to the PAN.

Referring still to FIG. 1, a latent Dirichlet allocation (LDA) is trained with the above document-word dataset in block 103. The number of topics is predefined a priori. Each word in the collection of documents has a probability of being related to each of the latent topics. Given the collection, the LDA "learns" the probability that each word of the collection related to each latent topic, and the probability that a document in the collection relates to each topic. Upon execution, the LDA model outputs a matrix describing the topic probability distribution for each PAN in block 104. It should be noted that not all the PANs have similar activity patterns. The PAN distribution may be heterogeneous across topics depending on the underlying transaction data distribution.

Main methods that the LDA model can use include a variational expectation maximum (EM) based algorithm, a Gibbs sampling-based algorithm, and an expectation-propagation algorithm. Table 1 shows an illustrative topic-document probability distribution with only three topics. After the LDA topic model is built, the probability of each document (PAN) appearing in each topic is obtained by a processor counting the words in its possession. For example, PAN 1 has a higher probability relating to topic 2, while PAN 2 has a higher probability relating to topic 1. Each document may have a different probability distribution. For each document (PAN), the probabilities in each topic may be combined to form a vector characterizing the mixed memberships in each topic. For example, PAN 1 may have a vector (0.1, 0.8, 0.1) and PAN 2 has (0.6, 0.1, 0.3). Those vectors may be referred to as document-vector (i.e., PAN vector in the transaction dataset) in the form of $$P_i = (p_{i,1}, p_{i,2}, p_{i,3}, \ldots, p_{i,n})$$

Where i denotes the index of a document (PAN) in the document set and i ranges from 1 to total number of PANs included in the document set, and n is total number of archetypes. The matrix $p_{i,j}$ expresses the probability of appearance of document (PAN) i on archetype j.

On the other hand, for each topic, a similar vector can be formed also by combining all the probabilities of each PAN such as (0.1, 0.6, 0.3) for topic 1. Such formed vectors may be referred to as topic (archetypic) vectors that depict variations of the memberships of all PANs, which may be written in the form of $$A_j = (p_{1,j}, p_{2,j}, p_{3,j}, \ldots, p_{m,j})$$

Where j denotes the index of an archetype included in the document set and j ranges from 1 to total number of archetypes, and m is number of PANs.

TABLE 1

Illustrative topic-document (PAN) probability distribution from an LDA model

|  | Topic 1 | Topic 2 | Topic 3 |
| --- | --- | --- | --- |
| PAN 1 | 0.1 | 0.8 | 0.1 |
| PAN 2 | 0.6 | 0.1 | 0.3 |
| PAN 3 | 0.3 | 0.3 | 0.4 |

FIG. 2 illustrates an exemplary distribution of the maximum probability of each PAN vector from a training dataset. The maximum probability refers to the maximum probability of the PAN vector P. For example, using the simple table shown in Table 1, the maximum probability is 0.8 for PAN 1 and 0.6 for PAN 2. In an exemplary distribution of a transaction dataset in FIG. 2, the distribution is demonstrated as heterogeneous in the sense that about 75% PANs have a maximum topic probability above 0.8, about 15% PANs are above 0.9, and about 25% have maximum probabilities between 0.5 and 0.6. It should be understood that the distribution is dependent on the characteristic distribution of the underlying transaction dataset.

Associating a document (identified by PAN) to certain archetypes can be considered as assigning the documents to archetype subsets. In some implementations, the most likely archetype is assigned to a PAN (document). All PANs are grouped into different subset and PANs in each subset are associated with same archetype. For example as seen in Table 1, archetype 2 may be assigned to PAN 1, archetype 1 may be assigned to PAN 2 and archetype 3 may be assigned to PAN 3. FIG. 3 illustrates the process of grouping transaction dataset into subsets. The PAN-archetype matrix (block 303) is obtained in FIG. 2 and for each PAN (ith PAN), the archetype with the maximum probability, max $(p_{i,j})$, j=1 . . . n, is found and is assigned to this PAN (block 304). This procedure virtually divides the transaction dataset (document set) into n small subsets (block 305) of a plurality of documents with each small set having the same archetype associated with them. It should be noted that the topic-document probability distribution is heterogeneous (FIG. 2); the corollary is that subsets (by archetype) may have varied numbers of PANs.

As observed in FIG. 2, the distribution of maximum probability for each PAN is not uniform. It is likely an archetype is assigned to a PAN with a low probability relating a specific archetype. For example, PAN 3 is related to archetype 3 with a probability of only 0.4, in contrast, PAN 1 is related to topic 2 with a probability of 0.8 and PAN 2 to archetype 1 with a probability of 0.6.

To reduce the occurrences of the low probability assigned to an archetype and improve the resolution with a concentration of higher probability for each archetype, in one implementation, a threshold Pt may be chosen such that only the PANs with maximum probability greater than the threshold Pt are assigned to the corresponding archetypes, and otherwise, those PANs are assigned to a special subset which may be referred to as a leftover archetype. The method finally assigns the incoming transaction to one of the (n+1) subsets, in each of which the PANs may behave in a similar manner in term of the frequency of the words which are extracted from the transaction data. For example, if the word is a combination of what customers buy and how much it costs, i.e., MCC-amount, then the PANs belonging to the same archetype would have transactions with similar MCC-amount combinations.

Note that this manner of assignment results in mutually exclusive archetype, i.e., each PAN can only be assigned to a single archetype or to the leftover subset. In some cases it may be preferable that a PAN may be assigned to more than one subset (or archetype) so the PAN can have a mixed membership in topics.

In such a scheme, the number of documents (PANs) assigned to each archetype is a function of the predefined threshold Pt. If Pt=0, the method reduces to the commonly used approach by which the maximum probability of the PAN vectors determines the membership for each PAN. Also, each PAN is assigned into only one archetype by the probability distribution in this manner. Other strategies to determine memberships for each document can be employed, such as, for example, using the mean or median values of PAN probability vectors compared with a threshold.

It is understood that each document (identified by PAN) in an archetype may contain a plurality of transactions in different times, locations, amounts, merchant category codes (MCCs), etc. Identifying the archetype subset is an intermediate step and the resulting archetype subsets are employed for further analysis or processing to conduct classification or detection. The transactions of the PANs in each subset may be composed of normal transactions or some outliers. The anomalous or fraudulent behaviors may be detected using a self-calibrating outlier model (referred to as SCOM herein) in the cases without transaction tags. Self-calibrating outlier models in accordance with some implementations are described in U.S. Pat. No. 8,027,439, the contents of which are incorporated by reference herein for all purposes, and are described briefly below.

Each transaction is characterized by the transaction date, transaction time, location, MCC, etc., and those quantities may be used directly as raw variables or indirectly by derived variables. For example, a moving average of spending amount may be defined as a derived variable to reveal the offset from the trend. In Falcon® models, derived variables may include "Ratio of Transaction Amount to Daily Average Transaction Amount", "Ratio of Current Transaction to the Maximum Value", etc. The set of variables is computed for each transaction and utilized for purpose of outlier detection according to an embodiment.

FIG. 4 illustrates exemplary variable distributions (histograms) in two different subsets (or archetypes) i and j (i≠j) formed by the above method. The horizontal axis indicates the variable values and the vertical axis indicates percentage of number of variable values in the range. The left plot shows the distribution in subset i and the two lines, solid and dashed, depict the distributions at two times (or periods) t1 and t2 (t2>t1), respectively. The distributions may vary from time t1 to t2. And the two sets of vertical lines show the locations of the quantiles 95% (dashed) and 99% (solid). It is to be noted that the quantiles are determined by the variable distribution and the locations of the quantiles may evolve with time. Those quantiles are useful for characterizing outliers in the dataset. Similarly for subset j on the right plot, two distributions at different times are also shown and the locations of the quantiles are plotted as well. In different subsets, the distributions may be different at the same time, depending on archetype groups and the characteristics of the underlying dataset.

To determine the outlier values in transactions, one needs to quantify the threshold point in the distribution of values of the variables where, if the variable value exceeded that point, it would be considered as an outlier. In past implementations, the 95% quantile of the distribution has been used to determine the threshold where the value is considered an outlier. We utilize the formula below to use a simple unconditional re-scaling across all independent variables $$q(x_i \mid \theta) \equiv \frac{x_i - \theta_{i,1}}{\theta_{i,2}} \in [0, C]$$

Where i denotes index of a variable, $((\theta_{i,1}, \theta_{i,2}) \in \theta)$ are location and scale parameters respectively of the computed distribution of independent variable $x_i$. For example, $\theta_1$ corresponds to the 95% quantile of the distribution and $\theta_2$ corresponds to the interval of the 95% and 99% quantiles of the distribution of the variable. The scaled value is bounded between $\theta_1$ and some constant C>0 to protect the analytics from extreme outlier values. It is important that these distributions are computed in real-time and adjusted with each transaction processed. Our method is a result of real-time estimates of the scaling parameters $(\theta_1, \theta_2) \in \theta$ using the production data. It is to be noted the quantiles can be estimated at other values based on the problems under investigation.

Utilization of the self-calibrating analytics approach described above then requires recursive estimates of the values of $\theta_{i,1}$ and $\theta_{i,2}$ (here assuming two parameters to scale the variables) associated with each of the $x_i$ variables. For a given variable x, its r-th percentile $\bar{x}^r$ is computed on the fly as the observations of x are received by the system.

FIG. 5 shows a block diagram of a self-calibrating outlier model according to an embodiment. For an ordered sequence of transactions (may be in a subset) (block 501), characteristic variables are selected and calculated for each transaction in 502. Based on the distribution of each variable, the 95% and 99% quantiles of each variable are calculated in block 503 (examples are seen in FIG. 4). The quantiles are rapidly calculated on the fly. Then these variables are dynamically scaled by the respective quantiles according to the above formula in block 504. All the scaled variables are non-negative as defined above. The scaled variables are related to the determination of severity of anomaly of those variables. For the purpose of outlier detection, the score model may be represented in the form of $$S = \sum_{i=1}^{K} w_i q(x_i \mid \theta)$$

Where K is number of the variables to participate in scoring, w is the weighting factor applied on each variable x, q is the scaled variable as defined above. The transaction score S (block 505) may be a linearly weighted sum of K scaled variables (note all the scaled variables are non-negative). The intuition may be that the larger value the scaled variable is, the riskier it is so that the relevant score may be higher, indicating the transaction is a likely outlier.

The self-calibrating functionality of the model is supported by the capability of estimating the scaling variables from the transaction dataset in a client's production environment. The outlier model is supposed to calibrate itself to the production environment and produce a fraud score S as a basic measurement on the fraud risk of each transaction. The weights associated with the fraud score can be selected as a uniform weighting or a combination of domain knowledge and client inputs. In the embodiment of the present invention, it is assumed that the uniform weighting is adopted but the weighting is not limited to the uniform weighting.

The transaction dataset is grouped into subsets in FIG. 3 by archetypes. For each subset, the abovementioned outlier model may be used to estimate the scores for each new transaction. The quantiles of each subset (and the leftover subset) may be first obtained from the transactions in each subset and saved, and then the new transaction will retrieve them for continuous estimation of quantiles with the new sample, so that the transaction score may be calculated from the scaled variables.

A new transaction is evaluated by the formed transaction subsets by archetypes built from the transaction and the LDA model parameters. It should be understood that such a model is developed without resorting to any tags of transaction dataset and the purpose is to identify outliers or anomalies. FIG. 6 shows a block diagram evaluating a new transaction with the LDA archetypes. A new transaction in 601 is input to 602 and then determined if it is related to any archetype by matching its PAN with a plurality of PANs in each archetype (603). For example, if a PAN appears in the shaded archetype, the transactions of this PAN are classified to the subset associated with this archetype. The quantiles for this subset are retrieved, updated and sent back to 602. It should be noted that the PAN of the new transaction may match the PAN in the leftover subset as defined above. Recall that this particular subset contains all the PANs with maximum topic probability less than an appropriately chosen threshold Pt as described above. To score a new transaction, the quantiles (for example, 95% and 99% quantiles) may be retrieved from the found subset (603) and the quantiles may be updated online with the new transaction added in. The scaled variables of the new transaction are readily calculated by using the updated quantiles for a subset in block 604. In one implementation, the score S is finally calculated with all the scaled variables summed up in 605.

Other ways to use the quantile-scaled variables to estimate the score can be used, such as using median value, squared sum, or the like.

In case the PAN of the new transaction is not in the existing subsets, the entire dataset can be combined together for quantile calculations, which may be referred to as global estimation. The global estimation may yield average performance. In real-time, the new transaction which has a new PAN may be added into the existing PAN pool for updating LDA document-archetype matrix. With quantiles calculated for each variable, the same procedure as above may apply to score such a transaction.

FIG. 7 shows an exemplary distribution of documents (i.e. PANs) in each subset including the leftover subset using a threshold Pt=0.8. The horizontal axis denotes the subset index and the vertical axis denotes the percentage of number of PANs appearing in respective subsets. A transaction dataset is used. Each transaction is characterized by transaction date, transaction time, amount, merchant category code (MCC), location, etc. The "word" used in the example is the combined characteristics of MCC and amount and "document" is the PAN (primary account number) associated with the transaction so that each PAN (document) contains a plurality of transactions characterized by the word "MCC-amount". The transaction amount is a continuous variable so it is discretized into a categorical variable. Three months transaction data is used to train an LDA topic model over the collection of documents and words.

In this example, the number of the archetypes is selected to be 20. The document (PAN)-topic distribution is emitted upon execution of the LDA procedure. The training dataset is then divided into subsets in terms of the maximum probability in each PAN vector. The distribution of the maximum values of probabilities is depicted in FIG. 2. In this case, the distribution is concentrated in two bands, and certainly the distribution is determined by the characteristics of the underlying transaction dataset. The threshold to assign a PAN to an archetype is set to be Pt=0.8. The assignment works as follows: if the maximum probability is greater than Pt=0.8 for a transaction, the corresponding archetype is assigned to the PAN; otherwise, it is assigned to a leftover subset that is subset 21 in this example. In the end, the transaction dataset is grouped into 21 subsets for further score calculation.

FIG. 7 demonstrates that the distribution is heterogeneous across archetypes and some archetype may hold a large portion of the PANs in the training dataset. For example, subset 16 takes more than 20% of PANs, subset 4 takes 12% of PANs. Further, the leftover subset (dashed vertical line, subset 21) takes over 27% of PANs for the threshold of Pt=0.8 in this example, i.e., about 27% of PANs have maximum probability in all the archetypes less than Pt=0.8. The figure shows that the distribution of the subset population is not uniform in this example, which is certainly determined by the underlying data distribution. The heterogeneous PAN distribution is exploited by two inventive methods to enhance the detection capability in accordance with some embodiments.

FIG. 8 illustrates exemplary performance using the LDA topic model and self-calibrating outlier model using a threshold. It should be pointed out that the LDA model and self-calibrating outlier model are unsupervised models and no transaction tags are used. To evaluate the performance of those models, it is necessary to include the tags to determine whether the model can catch bad transactions. In the example dataset, the tags are present (that is, each transaction is marked as either normal or fraudulent) and may be used to examine the performance of the model.

The new transaction dataset includes one month data after the training period (3 months) in the illustrative example. As described above, the PAN of the new transaction is utilized to find the relevant archetype from the plurality of archetypes numbered as 1-21. If not found, the entire dataset is used for global estimation. Then, by applying the self-calibrating outlier model (SCOM) in the corresponding subset, the scaled variables and scores are easily calculated with the steps described above. The performance of this described model (i.e., the LDA archetype and self-calibrating outlier model) is shown together with the simple self-calibrating outlier model for comparison.

Performance of a model is commonly measured by so-called ROC (receiver operating characteristics). The ROC graph examines the percentage of good (horizontal axis) versus the percentage of bad (vertical axis). The higher percentage of bad (vertical axis) at a given percentage of good (horizontal axis) indicates better detection capability. The solid line shows the performance of the combined models of LDA and self-calibrating outlier model. On the other hand, the performance of a self-calibrating outlier model is also denoted as a dashed line for comparison. For a simple self-calibrating outlier model the quantiles are thus calculated on the entire transaction dataset, in contrast to the LDA archetype and self-calibrating outlier model which applies self-calibrating on each subset associated to those latent LDA archetypes. It should be noted from FIG. 8 that the performance curve of the LDA archetype and self-calibrating outlier model (solid line) is above that of the self-calibrating outlier model (dashed line), indicating the advantageous contribution from the subsetting technique in terms of the latent LDA archetype. It may be understood that the LDA archetype groups similar entities (PANs and corresponding transactions) together, resulting in finer-grained clarification of the transactions on top of the coarse-grained clarification using the simple self-calibrating outlier model over the entire dataset (which mixes all the archetypes).

It is to be noted that in the example above, each PAN is solely assigned into one subset (determined by the LDA archetypes mutually exclusively). In fact, as illustrated in Table 1, each PAN has a mixed membership in all the LDA archetypes. That is, in general, the PAN does not possess 100% membership in an archetype. With those characteristics in the probability distribution in mind, the scoring process may consider additional contributions from non-major LDA archetypes. The major archetype may correspond to the maximum probability over the archetypes. For example, in Table 1, for PAN 1, archetype 2 is dominant but archetypes 1 and 3 both have non-zero probabilities so that each of both or combined may have contributions to PAN 1. For PAN 3, the contributions from archetypes 1 and 2 may be as significant as archetype 3 due to the small difference in the probability between the vector components, i.e, 0.3 vs 0.4. To accommodate the contributions from those archetypes, the score of a transaction may be written in the form of, in accordance with an embodiment, $$S = \sum_{j=1}^{n} p_j \sum_{i=1}^{K} w_i q_j(x_i | \theta_j)$$

Where K is number of the variables to participate in scoring, w is the weighting factor applied on each variable x, $q_j$ is the scaled variable for a subset as defined above, $\theta$ is the associated quantile quantity, $P_j$ indicates the probability of the PAN in an archetype and n is the total number of subsets. Note that in each subset the partial score may be a linearly weighted sum of K scaled variables and final agglomerative transaction score S is the sum of all the partial scores from respective subset, weighted by the membership probability in each subset. The expression provides a general method of combining contributions from each subset, based on the probability of appearance of a document in each subset. As usual, if a PAN of a new transaction exists in the subset, the score is obtained from the sum of all the partial scores in all the subsets; otherwise, the entire dataset is treated as a giant document set and the quantiles are calculated and the score is calculated accordingly. Partial scores may be contained in the subset only for those archetypes in which the probability is higher than a preset threshold.

FIG. 9 shows another distribution (histogram) of PAN's probability in each archetype in a transaction dataset. The number of archetypes is 35 and the words are combined traits of a transaction MCC-amount. The horizontal axis is the maximum probability for each PAN (document) and the vertical axis is the percentage of number of the PANs appearing in the range. Distinct from the characteristics in FIG. 2, the distribution is quite spread out in the entire probability range. The maximum percentage of a probability value is about 8%, so none of the probability appears dominant in the probability matrix. In such a scenario, the contributions due to each archetype may be required to sum up for better detection capability.

FIG. 10 shows an exemplary performance comparison of three models: 1) LDA archetype/SCOM with a static weighting scheme; 2) a simple self-calibrating outlier model (SCOM) only and 3) the LDA archetype/SCOM without a weighting scheme (i.e., using the large probability to assign a document to an archetype). The ROC graph is shown for performance comparison. The horizontal axis represents the percentage of good and the vertical axis represents the percentage of bad (frauds). The top solid curve denotes the LDA archetype/SCOM with the designed weighting scheme as described above, and the bottom curve (dotted-line) represents the self-calibrating outlier model only as a baseline. The LDA archetype/SCOM without the weighting scheme, i.e., assigning only one archetype to a PAN using the largest probability is denoted by the dashed line and is found it underperforms the weighting scheme, indicating that the weighting method aids in improving the model performance by combining contributions from all relevant archetypes. As seen below the static weighting method is shown further improved through online adjustment with the incorporation of the new transactions. Also performance using the threshold method described above (in which the threshold is the minimum probability to assign a document to an archetype and otherwise a document is sent to a leftover subset) is calculated. Its performance is between the weighting scheme result (solid line in FIG. 10) and the naïve method (dashed line in FIG. 10, non-weighting method) and is not plotted here. The results are understandable since the distribution of the probability is not heterogeneous and the weighting scheme sums up all the likely contributions. The improvement through online adjustment of the archetype distribution is also apparent as the weighting method is more sensitive to the shift in an entities archetype distribution as new transactions are made.

In a series of experiments with real transaction dataset, the LDA archetype/SCOM with the proposed static weighting scheme (solid line in FIG. 10) shows significant performance lift from the SCOM only (dotted line in FIG. 10) at various percentage of good and at a different number of latent archetypes, as seen in Table 2. The results demonstrate that the LDA/SCOM weighting method significantly outperforms the simple self-calibrating outlier model. For example the performance lift can be up to 25% over the simple self-calibrating outlier model (SCOM). The results also show the performance lift may peak at some number of archetypes for some percentage of nonfrauds, undoubtedly depending on the distribution of the documents (PAN) and word (transaction characteristic) with the dataset. Those skilled in the art may find an optimal number of archetypes based on the performance changes at various numbers of archetypes.

TABLE 2

Illustrative performance lift of the weighting method over the SCOM-only method

| | | Number of archetypes | | | |
|---|---|---|---|---|---|
| | | 15 | 25 | 35 | 55 |
| Percent Nonfrauds (%) | 0.5 | 24.38% | 26.87% | 23.61% | 23.99% |
| | 1 | 25.74% | 24.71% | 25.35% | 23.81% |
| | 2 | 20.03% | 19.21% | 23.17% | 20.69% |
| | 5 | 13.96% | 14.14% | 18.15% | 17.13% |

Executing an LDA model may generate the word-archetype probability matrix from the training dataset, and the LDA model may be regularly trained for a period of transaction data. For example, at the end of every 3 months, the LDA model may be retrained and may be applied on the subsequent new transactions to accommodate the changes in the transaction patterns. This type of processing may be referred to as batch mode processing. The LDA model needs to keep updating to improve the capability of detecting outliers in the transactions in such a data-driven way. The above-mentioned threshold and weighting methods may be used in the evaluation of new transactions in such a batch mode operation.

Furthermore, the LDA model may be updated more frequently with new transactions taken in such that the changing transaction patterns or outliers may be detected in a shorter time. While training an LDA model or other topic models proved expensive and time-consuming on a full scale, the existing topic model can be updated with new transactions without retraining the entire model. Such a strategy would reduce the frequency of costly model training, saving processing time but it would augment the model capability with the new transactions at a quick pace. The kind of processing may be called online training and updating, which is different from the batch processing in that new transactions are faster to participate into the model.

FIG. 11 shows a schematic diagram of such an online process. A topic model 1101 is trained with the transactions in a period L1 and then the model is applied to new transactions in the subsequent period L2. For example, an LDA model is trained using transactions in a period of L1=3 months and is thus used to score transactions in the subsequent period L2=1 week. The lengths of L1 and L2 windows may be determined according to business need. For the subsequent period, the scoring process may use the above threshold or weighting methods as described in details.

The window L1 may slide by a length of L2 to score the transactions in the next period L3 in 1102 so that the transactions in L2 may be used to update the model. L3 may be the same length as L2. The transactions in L3 may be scored by the model trained based on transactions in the L1 period. The model is not needed to be fully updated but the word-archetype probability distribution may be assumed not to vary in a dramatic way, therefore the word-archetype distribution in the current L1 period (1102) would be a good approximation by using the same word-archetype distribution as before (1101). With such a distribution approximated, the document (PAN)-archetype probability matrix may be updated for the current period L3 (new data) and partial period from the previous L1 period plus L2 period. The new transactions in L3 are obviously scored by the model that has been updated by the transactions in the previous L2 period. As before, the same scoring procedure now applies to the new transactions in L3 with the updated document-archetype model, such as threshold or weighting methods.

The same procedure may repeat. The L1 window slides again for another period of L4 in which new transactions are to be scored. Let's assume L1=3 months, and L2=L3=L4=L5=1 week. After 3 window slides (1102, 1103, 1104), the topic model may need to be retrained for next round. The frequency of retraining is fully dependent upon the data underlying the model or the business requirements. The retraining of the topic model marks the end of such a training-updating cycle and then a new topic model (1105) has to be developed for the next round of scoring processes. For example, 4 weeks old topic model (1101) is replaced with a new topic model (1105) for subsequent transaction scoring. The procedure repeats itself and the LDA model keeps training and updating after a fixed period. Those skilled in the art may find it to be useful to retrain a topic model if the current window slides out of the previous topic training window or if there is still some overlap between them. The same sliding window training and updating scheme still applies herein.

FIG. 12 illustrates an exemplary performance of the online method. As before, the ROC graph is shown for comparison. The solid line represents the performance of the proposed online method for LDA weighting while the dashed line represents that of the offline method (i.e., batch method) for LDA weighting. The solid line is in general higher than the dashed line, demonstrating that the online method shows superior performance relative to that of the batch method because the new transactions are incorporated into the model faster than the conventional batch approach, thus yielding a robust and adaptive model.

In executing a topic model like LDA, the words extracted from the dataset can be some traits of transactions such as MCC, date, time, location, amount, etc., or combinations of them. In various experiments, it is noted that using words like the aggregate entity such as MCC-amount can outperform those using words of a single trait such as MCC only, probably because the aggregate entity may capture some interactive characteristics of the fraudulent transactions. Those skilled in the art may find other composite entities useful such as derived (transformed) variables in additional the raw transaction features. Furthermore, the LDA/SCOM methods can apply to the subpopulation of the datasets like card-present, card-not-present, domestic or foreign transactions, in each of which the words may differ in terms of their respective characteristics.

Accordingly, a system and method is provided to detect frauds or anomalies in transaction dataset in an unsupervised setting. The transactions of PANs are characterized by some selected words so that the LDA model can be executed on the latent topics to aggregate the PANs into archetypes. Transactions of a PAN are assigned to a subset associated with the archetype. Thus the plurality of subsets divide the feature space into many subspaces. Each subspace may stack the collective discriminative capability and serve as a better touchstone for a new transaction. Furthermore, although the transaction dataset is used for illustrative purpose, the present invention may apply to other types of datasets to detect anomalous behavior.

In some implementations, the subsets are generated by quantifying the probability of document related to an archetype. The quantiles are thus calculated and saved. A new transaction comes in and finds the right subset to associate with by matching its PAN with those in each subset. The new transaction generates the quantile-scaled variables and the score is obtained using the self-calibrating outlier model. The inventive method that employs the LDA archetype and the self-calibrating outlier model in tandem is demonstrated to outperform that of the single self-calibrating outlier model because the segmented feature space may provide some insightful and thus improved capability on detection of frauds or outliers. In the various exemplary experiments, the performance of the different models has been compared and is found that the performance appears to decrease in the following order, relative to that of the self-calibrating outlier model (SCOM):

1) LDA model and SCOM with the weighting method to sum up all the contributions of all archetypes in terms of the probability in each archetype
2) LDA model and SCOM with a probability threshold to assign a document to only one archetype. The leftover subset includes all the documents with smaller than the threshold probability
3) LDA model and SCOM to assign a document to only one archetype based on the maximum probability of the document in all the archetypes.

The weighting method may be extended to include a threshold when summing up contributions. The formula may be written in the form of $$S = \sum_{j=1}^{n} p_j H(p_j - p_t) \sum_{i=1}^{K} w_i q_j(x_i | \theta_j)$$

Where K is number of the variables to participate in scoring, w is the weighting factor applied on each variable x, $q_j$ is the scaled variable for a subset as defined above, $\theta$ is the associated quantile quantity, $P_j$ indicates the probability of the PAN in an archetype and n is the total number of subsets. $P_t$ is a threshold designed to discard the contributions from some lower probability subsets, H is a Heaviside function, that is, if t>0 then H(t)=1, otherwise H(t)=0. The above expression provides a more general form of the weighting method used in the LDA/SCOM. The threshold is preset and should be dependent upon the characteristics of the dataset under investigation.

In summary, a method to detect outliers can include the following steps:
1) execute an LDA topic model to obtain the document-topic probability matrix on a collection of documents and words which are defined on the traits of the data.
2) split the dataset into subsets in terms of the archetypes. A threshold may be defined for an archetype to be assigned to a document (PAN).
3) a incoming transaction first finds its association with the a subsets, generating quantiles for characteristic variables using the self-calibrating method.
4) obtain quantile scaled variables and generate a score for the new transaction based upon the scaled quantities. The weighting method may apply.
5) the new transaction may be fed back to the transaction dataset for updating the LDA probability matrix, which indicates that it may be implemented in real-time processing or in the online method.

A detection system may be built to employ the LDA topic model and self-calibrating outlier model (SCOM) for real time operations. The system is not limited to detecting frauds in a transaction dataset, but can be extended into other areas to detect anomalies or anomalous behavior. The "divide and conquer" scheme in which the dataset is divided by the LDA archetype model in terms of the latent topics and the anomalous behavior is quantified and detected in a respective subset by the self-calibrating outlier model, provides better resolutions on the detection performance as demonstrated above in the example transaction dataset.

FIG. 13 illustrates a system that facilitates detecting fraudulent entities in real time to automatically detect outliers. An initial dataset 1301 is input and used to generate a topic model using an LDA model or the like, which exploits the intrinsic relationship between words and topics, to yield a document (PAN)-archetype probability matrix (1302). The words used in executing an LDA model can be some traits of transactions such as MCC, date, time, location, amount, or aggregate of a few, etc. of user's choice.

Each cell in the document-archetype matrix represents the probability of appearance of a document in a latent archetype. The number of archetypes is not known a priori and has to be fixed before executing an LDA model. Those skilled in the art may find an optimal number of archetypes when training a variety of parametric models on their datasets. Based on probability values of documents (PANs) in each archetype, each PAN may be assigned to a principal archetype in terms of the maximum probability. In some implementations, a probability threshold can be set, below which the assignment is given to a leftover subset in order to improve the model robustness and stability. The transaction dataset is thus divided into subsets, within each of which the PANs are closely related to an archetype in 1303. The number of the subsets is the number of the archetypes plus one leftover subset if the probability threshold is implemented. These formed subsets of the transaction dataset may serve as an outlier detector by using the self-calibrating outlier model. It is noted that each subset contains a plurality of documents (PANs), and each PAN corresponds to a plurality of transactions that clients made in different times, at different locations, on different merchants, etc.

The PAN information is extracted from a new transaction 1304 which is to be scored, and the PAN is utilized as a key to find its membership to those subsets. For the new transaction added to the found subset, the quantiles are calculated based on all the samples in the subset, and then the variables are scaled in 1305 by the formula described above. In case the PAN is a new one, the entire dataset would be used to obtain the quantiles and the scaling is performed on those quantiles. After the scaling is finished, the score is calculated in 1306 in terms of those scaled variables for the new transaction. If the calculated score is above some predefined threshold, a warning may be generated so that the transaction may be investigated in 1307. For example, if the score is in the score interval [0, 0.8*C], C is a user-set maximum score constant, the transaction may be labeled as normal transaction and if in the score in the interval (0.8*C, C], the transaction may be labeled as a fraudulent transaction.

The new transaction may be added back to the dataset for LDA execution. The document-topic probability matrix may be updated to incorporate the latest transaction characteristics. The data feedback and LDA model updating aids in accommodating the change in the transaction dynamics and fraudulent behavior. Examples of such methods include the gensim package (https://radimrehurek.com/gensim/index.html) that is capable of updating the topic model online with new inputs. With the dynamic incorporation of new transactions into the models, the system implemented in FIG. 13 is capable of operating in real-time and automatically set to detect fraudulent or anomalous behavior as they occur.

The above system and method makes it feasible to process vast numbers of transactions in a real time environment as an online mode identification system. For example, three or more months of transaction data can be processed according to systems and methods disclosed herein, to build a topic model, and the resulting model can be used for a next one week period of transactions. Once the new transactions are processed, the training window may slide and new transactions can be filled into the train data window, and thus the topic model can be updated, with reference to FIG. 11). Compared with the conventional batch processing, the topic model is more frequent to get updated, incorporating the new transactions (and changing transaction dynamics) into the model in a shorter time to improve the model's detection capability. The training and updating processes form a cycle and the frequency to retrain the topic model is fully up to the underlying transaction data characteristics or business requirements, therefore, the online processing model implemented above is in harmony with the data-driven way.

In addition, after the transactions are processed, the changes in the document-archetype probability matrix of the model may indicate the changes in the transaction patterns. The investigations over the distribution of PANs in each archetype and PAN's population change from time to time may provide insight information on the likely changes in patterns in the transaction datasets. Such derived information may aid customers in highlighting some behaviors of the account holders to mitigate potential monetary loss.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for detecting transaction outliers in a dataset representing a plurality of transactions, the method compromising:
    selecting, by one or more data processors, words of documents associated with a plurality of transaction characteristics in the dataset;
    executing, by one or more data processors, a topic model using the words of the documents in the dataset to generate a document-archetype probability matrix comprising a plurality of archetypes;

assigning, by one or more data processors, each document to at least one archetype of the plurality of archetypes based on probability values associated with the topic model, wherein assigning each document to at least one archetype comprises assigning a document to an archetype based on a probability threshold of the document on the archetype;

dividing, by one or more data processors, the documents of the dataset into different subsets based on the at least one archetype;

computing, by one or more data processors, quantiles for each subset of the dataset for an incoming transaction to generate quantile scaled variables for at least one archetype;

identifying, by one or more data processors, at least one archetype for an incoming transaction, wherein identifying the at least one archetype comprises:
   matching an unique identifier of the document with a plurality of unique identifiers in each archetype of the plurality of archetypes,
   classifying transactions associated with the unique identifier to a subset associated with the matched archetype,
   receiving, by the one or more type data processors, quantiles for the subset; and scoring, by one or more data processors, the incoming transaction based on the statistics of the different subsets associated with the at least one archetype, where in the scoring is based on a self-calibrating outlier model.

2. A method in accordance with claim 1, wherein the scoring the incoming transaction further comprises:
   selecting at least one subset associated with the archetype of the plurality of archetypes based on transaction characteristics of the incoming transaction;
   calculating quantiles for the selected at least one subset for the at least one archetype;
   scaling variables of the transaction with the quantiles values for the at least one archetype; and
   calculating the score with the quantile-scaled variables.

3. A method in accordance with claim 2, further comprising:
   generating, by one or more data processors, a warning for an outlier for conveyance by a computer if the score is higher than a predefined threshold; and
   updating, by one or more data processors, the topic model in a real time operation environment using the sliding window technique.

4. A method in accordance with claim 1, wherein the transaction characteristics include transaction date, transaction time, amount, location, and/or merchant category code (MCC).

5. A method in accordance with claim 1, wherein the topic model includes a Latent Dirichlet allocation (LDA) model.

6. A method in accordance with claim 1, wherein identifying the at least one archetype further comprises updating, by one or more data processors, the quantiles for each subset for the plurality of transactions including the new transaction.

7. A method in accordance with claim 6, wherein updating the quantiles for each subset comprises updating the topic model with the new transaction without retraining the entire model.

8. A method in accordance with claim 1, wherein the scoring the incoming transaction further comprises applying a weighting factor on each variable for a subset of the different subsets.

9. A method in accordance with claim 8, wherein applying the weighting factor comprises weighting a score of the incoming trip transaction by a membership probability in each subset of the different subsets associated with the at least one archetype.

10. A computer-implemented method for detecting transaction outliers in a plurality of transactions in a dataset, the method comprising:
   executing, by one or more data processors, a Latent Dirichlet Allocation (LDA) topic model to obtain a document-topic probability matrix on a collection of documents and words from a plurality of transaction characteristics in a dataset of transactions;
   splitting, by one or more data processors, the dataset into subsets according to a probability distribution defined by the document-topic probability matrix from the LDA topic model, the probability distribution further defining a plurality of archetypes, each archetype having a designed threshold;
   associating, by one or more data processors, a new transaction with at least one archetype from the plurality of archetypes, the associating based on a probability threshold of the new transaction on the at least one archetype; wherein associating the new transaction with the at least one archetype comprises:
     matching an unique identifier of the document with a plurality of unique identifiers in each archetype of the plurality of archetypes, and
     classifying transactions associated with the unique identifier to a subset associated with the matched archetype,
   calculating, by one or more data processors, quantiles for each subset of the dataset for the new transaction to generate quantile scaled variables for at least one archetype;
   scoring, by one or more data processors, the new transaction according to the quantile scaled variables for the at least one archetype, wherein the scoring is based on a self-calibrating outlier model;
   updating, by one or more data processors, the quantiles for each subset for the plurality of transactions including the new transaction; and
   updating, by one or more data processors, the LDA topic model-based document-topic probability matrix based on the characteristics of the new transaction.

11. A method in accordance with claim 10, wherein the scoring the new transaction further comprises:
   selecting at least one subset associated with the archetype of the plurality of archetypes based on transaction characteristics of the new transaction;
   calculating the quantiles for the selected at least one subset;
   scaling variables of the transaction with the quantiles of the at least one subset; and
   calculating the score with the quantile-scaled variables associated with the at least one archetype.

12. A method in accordance with claim 11, further comprising:
   generating, by one or more data processors, a warning for an outlier for conveyance by a computer if the score is higher than a predefined threshold; and
   updating, by one or more data processors, the topic model in a real time operation environment using the sliding window technique.

13. A method in accordance with claim 10, wherein the plurality of transactions are defined according to transaction characteristics.

14. A method in accordance with claim 13, wherein the transaction characteristics include transaction date, transaction time, amount, location, and/or merchant category code (MCC).

15. A system for detecting transaction outliers in a dataset representing a plurality of transactions, the system comprising:
at least one programmable processor; and
a machine-readable medium storing instructions that, when executed by the at least one processor, cause the at least one programmable processor to perform operations comprising:
selecting words of documents associated with a plurality of transaction characteristics in the dataset;
executing a topic model using the words of the documents in the dataset to generate a document-archetype probability matrix comprising a plurality of archetypes;
assigning each document to at least one archetype of the plurality of archetypes based on probability values associated with the topic model, wherein assigning each document to at least one archetype comprises assigning a document to an archetype based on a probability threshold of the document on the archetype;
dividing the documents of the dataset into different subsets based on the at least one archetype;
computing, by one or more data processors, quantiles for each subset of the dataset for an incoming transaction to generate quantile scaled variables for at least one archetype;
identifying, by one or more data processors, at least one archetype for an incoming transaction, wherein identifying the at least one archetype comprises:
matching an unique identifier of the document with a plurality of unique identifiers in each archetype of the plurality of archetypes,
classifying transactions associated with the unique identifier to a subset associated with the matched archetype, and
receiving, by the one or more type data processors, quantiles for the subset; and
scoring, by one or more data processors, the incoming transaction based on the statistics of the different subsets associated with the at least one archetype, where in the scoring is based on a self-calibrating outlier model.

16. A system in accordance with claim 15, wherein the scoring the one or more incoming transactions further includes operations comprising:
selecting at least one subset associated with the archetype of the plurality of archetypes based on transaction characteristics of the new transaction;
calculating quantiles for the selected at least one subset;
scaling variables of the transaction with the quantiles of at least one archetype; and
calculating the score with the quantile-scaled variables associated with the at least one archetype.

17. A system in accordance with claim 16, wherein the operations further comprise:
generating a warning for an outlier for conveyance by a computer if the score is higher than a predefined threshold; and
updating the topic model in a real time operation environment using the sliding window technique.

18. A system in accordance with claim 15, wherein the transaction characteristics include transaction date, transaction time, amount, location, and/or merchant category code (MCC).

19. A system in accordance with claim 15, wherein the topic model includes a Latent Dirichlet allocation (LDA) model.

* * * * *